United States Patent

[11] 3,616,147

[72] Inventor Jere B. Ambrose
Birmingham, Mich.
[21] Appl. No. 43,755
[22] Filed June 5, 1970
[45] Patented Oct. 26, 1971
[73] Assignee Northern Fibre Products Company
Birmingham, Mich.

[54] WELT SEAMING LACE ASSEMBLY
3 Claims, 11 Drawing Figs.

[52] U.S. Cl. ..................................... 161/89,
156/148, 156/177, 156/179, 156/244, 156/436,
156/500, 161/125, 161/140, 161/149, 161/166,
161/175
[51] Int. Cl. ..................................... B32b 5/28,
B32b 27/12
[50] Field of Search ........................ 156/148,
149, 244, 177, 179, 436, 500; 161/89, 125, 140,
149, 166, 175

[56] References Cited
UNITED STATES PATENTS
2,932,121 4/1960 Weitzel ........................ 161/101
3,086,216 4/1963 Brook et al. ................. 161/119
3,535,195 10/1970 Loew........................... 161/101

Primary Examiner—William A. Powell
Attorney—Cullen, Settle, Sloman and Cantor

ABSTRACT: A welt seaming lace assembly, for forming welted seams for upholstered furniture, formed of a thin, flexible, thermoplastic core covered with an open braided mesh formed of thread, and a heat reactable adhesive coating the thread and core, and a thin, thermoplastic, outer covering, including an integral sewing flange, hot extruded around the adhesive coated mesh covered core. The adhesive coating is applied hot to momentarily soften the core for both adhesively bonding to and partially embedding the thread in the surface of the core. Later, after cooling, the extrusion of the outer covering reactivates the adhesive for adhesively bonding the core and threads to and partially embedding the threads in the outer covering.

PATENTED OCT 26 1971

3,616,147

INVENTOR
JERE B. AMBROSE

BY Cullen, Settle, Sloman & Cantor
ATTORNEYS

WELT SEAMING LACE ASSEMBLY

BACKGROUND OF INVENTION

As disclosed in my U.S. patent application Ser. No. 689,837, filed Dec. 12, 1967, now U.S. Pat. No. 3,531,366 welt seaming lace assemblies, which are used to form the welted seams commonly found in upholstered furniture, have been made of a filler surrounded by a cloth ribbon whose edges are secured together to form a continuous flap or sewing flange to which the upholstery fabric is sewn.

My prior application above discloses a filler formed of a thermoplastic core or rod covered with an open braided mesh formed of thread. A heat reactable adhesive coats the thread and core and the heat of the adhesive, when applied, momentarily softens the hard, smooth surface of the rod to cause the thread to embed into such surface as well as to be adhesively bonded thereto.

Such fillers have then been used in the conventional way, meaning applying the conventional cloth ribbon by wrapping the ribbon around the filler and securing it in place either with sewing or adhesive.

The invention herein relates to an improved lace and method of forming such lace by extruding the outer covering upon the filler.

SUMMARY OF INVENTION

In summary, the invention herein contemplates first forming the filler as described above by adhesively bonding and embedding the threads of the open braided mesh to the surface of the hard, smooth, thin and flexible thermoplastic rod by means of a hot application adhesive which momentarily softens the surface of the rod and thereafter, directly extruding upon the mesh covered rod or core the outer covering. The outer covering is formed of a hot, extrudable thermoplastic resin so that the heat of extrusion reactivates the previously cooled adhesive for simultaneously bonding the interior surface of the outer covering to the threads and core and embedding the threads in the outer covering.

With such extrusion of the outer covering, the flap or sewing flange is extruded simultaneously so as to be integral with the covering, thereby resulting in arranging the flange longitudinally straight or parallel to the axis of the lace and avoiding the problem of such flange tending to spiral around the lace when formed in the conventional cloth ribbon applied manner.

The outer covering, the rod and thread are locked together so that the outer covering will not slip relative to the rod either longitudinally or circumferentially when the lace is bent and twisted during sewing of the upholstery cloth to the flange, thereby resulting in a neater and better appearing as well as easier to work upholstered seam.

These and other objects and advantages of this invention will become apparent upon reading the following description, of which the attached drawings form a part.

DETAILED DESCRIPTION

Figure 1:
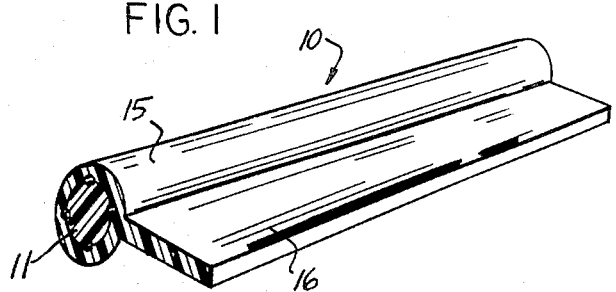
FIG. 1 is a perspective view of a short length of the welt seaming lace assembly herein.

FIG. 1 illustrates the welt seaming lace assembly 10 which comprises a filler formed of a core or rod 11 surrounded by an open mesh braid 12 formed of thin threads 13, in turn coated with a heat reactable adhesive coating 14 and an outer cover or wrapping 15 having an integral sewing flange or flap 16. Although the sizes of such assembly may vary, a typical size would be roughly ⅛-inch diameter with a flange of roughly one-fourth inch in radial length. Longitudinally, the lace may be of any length coiled into large rolls.

The core 11 is formed of a thin, flexible, thermoplastic rod, such as of polyethylene of approximately one-eighth of an inch or less in diameter. The threads 13 forming the braided mesh 12 are of considerably less diameter, such as in the order of .005 to .010 inches in diameter and may be formed of any suitable material, but preferably of a plastic, such as a rayon, whose melting point is considerably higher than the melting point of the core or rod material.

The adhesive may be of any of the conventional available hot application adhesives suitable for the purpose.

The outer cover or wrapping 15 may be formed of any flexible, hot extrudable plastic, such as a suitable polyethylene or the like. Various known materials are suitable for the purposes of the foregoing core, threads, adhesive and outer cover and the choice of the material may vary depending upon availability, cost, desired strength and appearance results, etc. The outer cover plastic should be extrudable at a temperature below the melting point of the thread and at the temperature necessary to reactivate the adhesive.

Figures 2, 3, 4, 5:
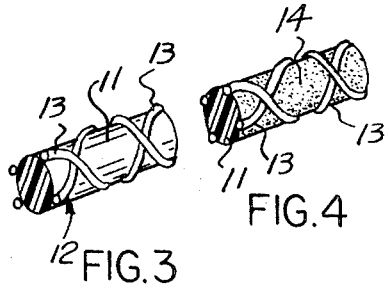
FIGS. 2–5, inclusive, are perspective views showing the successive steps in the assembly of the lace.
Figure 6:
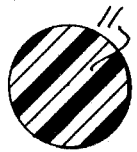
FIGS. 6–9, inclusive, are enlarged cross-sectional views, each showing successive steps in the assembly process and each respectively corresponding to the steps shown in FIGS. 2–5, inclusive.
Figure 7:
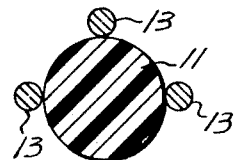
Figure 8:
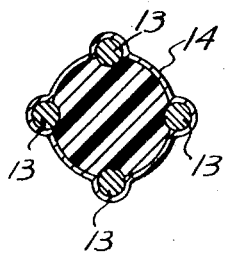
Figure 9:
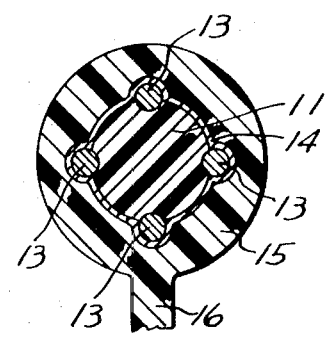

The method of forming the lace assembly, as illustrated in FIGS. 2–5, inclusive, and FIGS. 6–9, inclusive, is as follows:

The smooth, hard surface core or rod 11 (see FIGS. 2 and 6) is passed through a conventional braiding machine which applies the open mesh braid 12 formed of threads 13 (see FIGS. 3 and 7). Thereafter, a coating of hot application adhesive is applied. The heat of the adhesive is sufficient to momentarily soften the outer surface of the core so that the threads 13 become embedded within such surface as well as being adhesively bonded thereto (see FIGS. 4 and 8).

Next, the adhesive coated, mesh covered core is passed through a conventional extrusion machine which hot extrudes the outer cover 15 with its integral flange 16, thereon. The heat of the extrusion is sufficient to reactivate the adhesive coating 14 so that simultaneously the outer cover is adhesively bonded to the core and threads, while the threads are embedded into the outer covering (see FIGS. 5 and 9).

Figure 10:
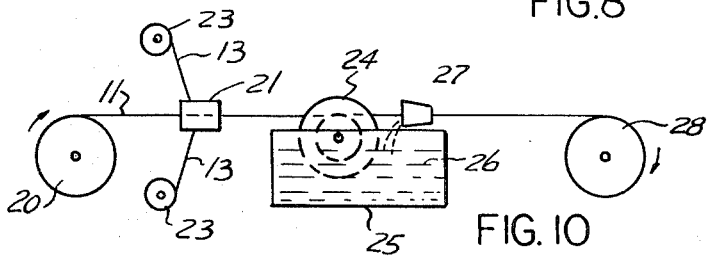
FIG. 10 is a schematic view of the apparatus forming the mesh-rod-adhesive coated filler.
Figure 11:
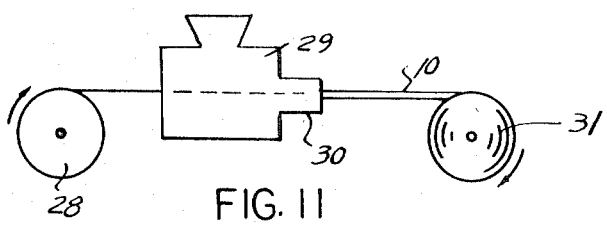
FIG. 11 is a schematic view of the apparatus for extruding the outer covering.

FIGS. 10 and 11 schematically illustrate the apparatus used in the foregoing process. Thus, in FIG. 10, the core 11 is unwound from a supply roll 20 and fed through the braiding head 21 of a conventional open mesh braiding machine. The threads 13 fed into the braiding head from rolls of thread 23 are thus applied to the core.

Thereafter, the core is passed through the peripheral channel of a pulley-shaped wheel 24 whose lower part is immersed in a tank 25 of hot adhesive 26. The pulley-shaped roller 24 in effect picks up the hot adhesive as it rolls around, and applies it to the core.

The adhesive coated core passes through a funnel-shaped scraper 27 which removes the excess adhesive and thereafter the adhesive coated, braid covered core is rewound into a takeoff roll 28. Before rewinding the momentarily softened core is sufficiently cooled so that the threads remain embedded within its surface.

Next, referring to FIG. 11, the roll 28 is unwound with the filler now passed through a conventional plastic extrusion machine 29 having an extrusion nozzle 30 shaped to produce the outer covering-flange configuration. Thus, the outer covering is extruded in a conventional manner, upon the core to form the lace assembly 10 which is then wound into a takeoff roll 31 for storage, shipment and ultimate use.

With this process, the overall cost of the lace is considerably reduced, since hand labor and sewing associated with conventional ribbon formed outer coverings is completely eliminated, and the overall product is of a considerably higher grade or quality because the flange is straight or axially parallel to the core and the parts forming the assembly are rigidly locked together in such a way that they cannot relatively move although the lace itself is sufficiently flexible for forming bends and the like in welted seams.

Having fully described an operative embodiment of this invention, I now claim:

1. A method of forming a welt seaming lace assembly comprising a core formed of a thin, smooth, thermoplastic, flexible rod, surrounded along its full length by a braided open mesh formed of thread, in turn surrounded by an extruded, thin, flexible, outer plastic covering, having an integral radially outwardly extending flange, comprising the steps of:

first, braiding the thread around the core to form the open mesh thereon;

then, coating the mesh covered core with an adhesive characterized by being heat reactable, with the adhesive being applied hot at a sufficiently high temperature to momentarily soften the surface of the core for simultaneously adhesively bonding the thread to the core as well as causing the thread to partially embed into and thereby mechanically interlock with the then softened surface of the core;

next permitting the adhesive coated mesh covered core to cool;

thereafter, hot extruding the outer plastic covering around the adhesive coated, mesh covered core at a temperature sufficient to reactivate the adhesive coating so that simultaneously the adhesive bonds the threads and core to, and causes the threads to partially embed in the inner surface of the plastic covering;

then cooling the assembly to complete the adhesive bonding of the parts and the mechanical interlocking of the thread to the outer covering.

2. In a welt seaming lace assembly comprising a thin, flexible core, formed of a thermoplastic material which is smooth, hard and flexible at room temperatures, but which softens at elevated temperatures, and returns to room temperature conditions when cooled;

and a braided open mesh surrounding the core along its full length and formed of a thread having a higher melting point than that of the core material;

and a heat reactable adhesive surrounding the mesh covered core, said threads being heat bonded adhesively to as well as partially embedded into the surface of the core for mechanically interlocking therewith;

the improvement comprising:

a thin wall thermoplastic outer covering completely surrounding and extending the full length of the adhesive coated mesh covered core and formed of a material having a lower melting point than the thread, said thread and core being heat bonded adhesively to the inner surface of the covering as well as the thread being partially embedded into said surface for mechanical interlocking therewith for forming the completed assembly.

3. A construction as defined in claim 2, and including a thin, radially outwardly extending flange, having an inner end formed integral with said outer covering.